Dec. 25, 1951 F. J. PERHATS 2,579,958
AUTOMATIC STARTING SYSTEM FOR INTERNAL-COMBUSTION ENGINES
Filed May 20, 1950 2 SHEETS—SHEET 1
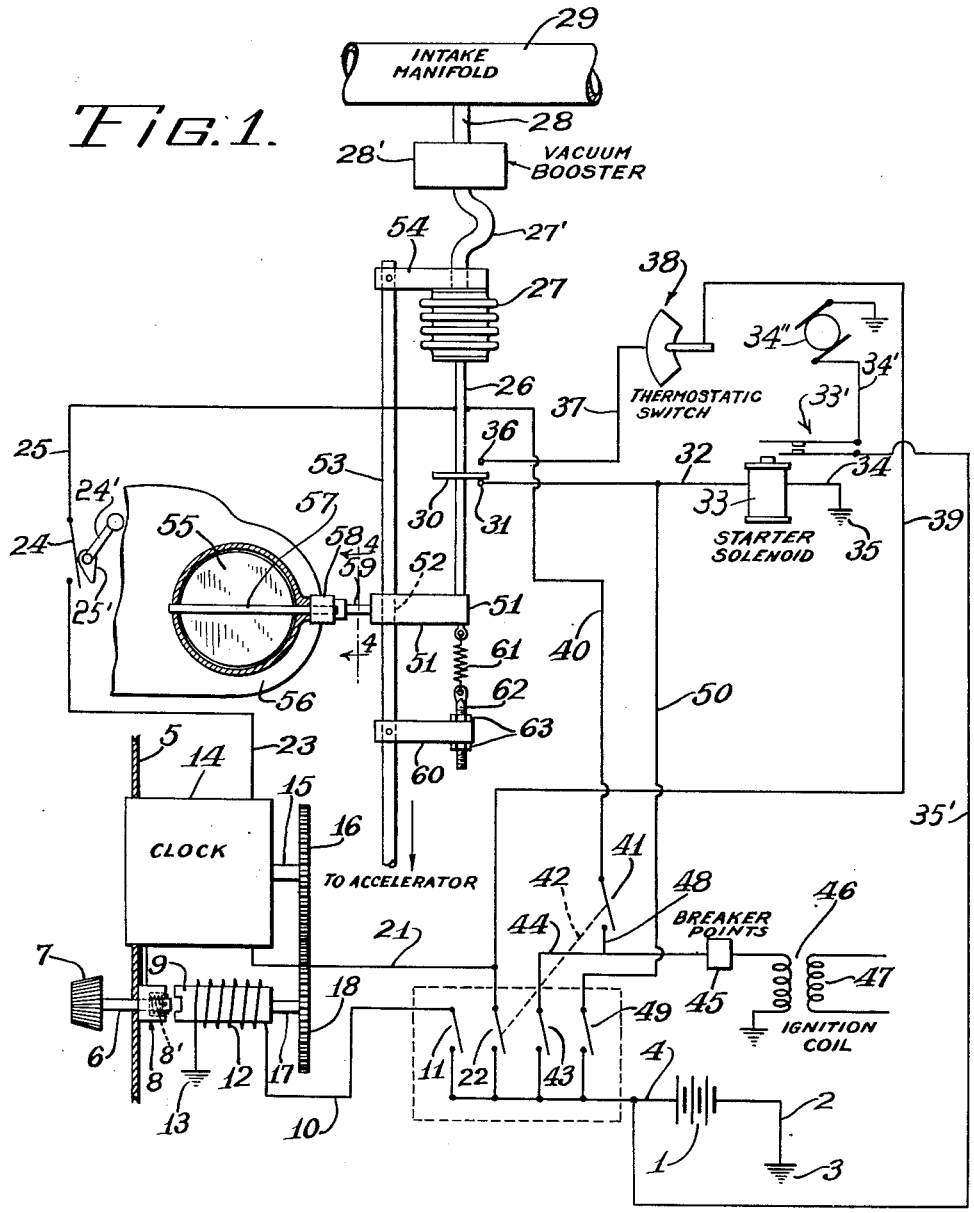
Inventor:
Francis J. Perhats
By Gary Desmond & Parker
Attys.

Dec. 25, 1951   F. J. PERHATS   2,579,958
AUTOMATIC STARTING SYSTEM FOR INTERNAL-COMBUSTION ENGINES
Filed May 20, 1950   2 SHEETS—SHEET 2
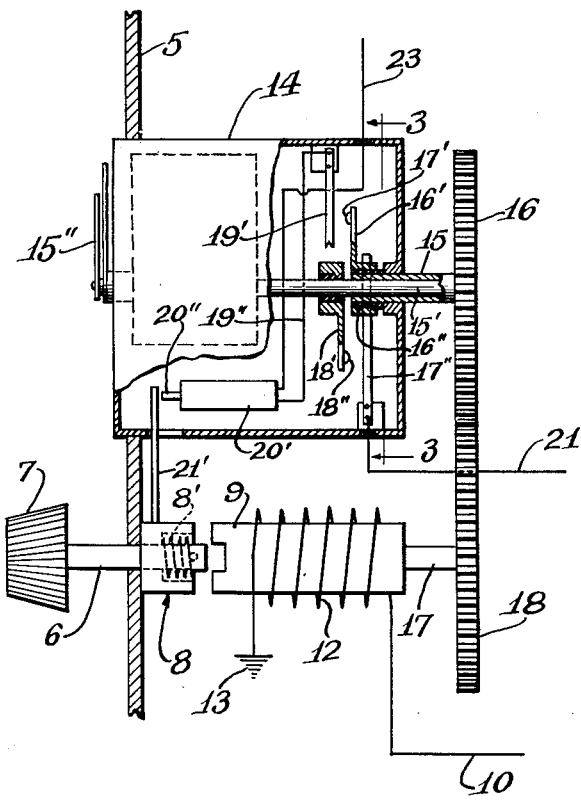
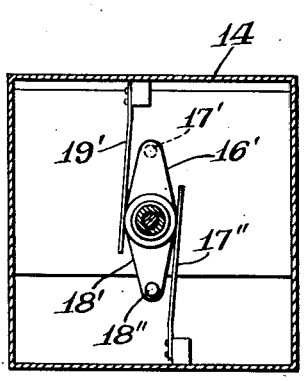
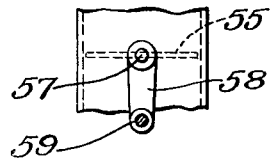
Inventor:
Francis J. Perhats
By Gary, Desmond & Parker
Attys.

Patented Dec. 25, 1951

2,579,958

UNITED STATES PATENT OFFICE 2,579,958

AUTOMATIC STARTING SYSTEM FOR INTERNAL-COMBUSTION ENGINES

Francis J. Perhats, Chicago, Ill.

Application May 20, 1950, Serial No. 163,308

9 Claims. (Cl. 290—38)

This invention relates to improvements in a device for automatically starting an internal combustion engine, and refers particularly to a device for automatically energizing the starting motor and ignition circuits of an internal combustion engine at a predetermined time; maintaining the starting motor potentially energized for a predetermined period of time, and automatically stopping the operation of the internal combustion engine when the temperature thereof reaches a predetermined degree.

It is frequently desirable, particularly in cold climates, to have the engine of an automobile and the interior of the automobile warm at a predetermined time when the operator may wish to commence driving the automobile. For instance, when parking the automobile out of doors or in an unheated garage in cold weather, the operator may plan on driving the automobile at a predetermined time of the day. If, after the automobile has been parked a sufficient time to permit the engine and car interior to become cold, it is most desirable that, when the driver commences driving the automobile the engine be warm and the interior of the car comfortable.

My present invention contemplates as an important feature thereof a system or device whereby the engine of an automobile may be automatically set into operation at a predetermined time and may be automatically shut off when the engine temperature reaches a predetermined temperature.

As another important feature of my invention means is contemplated for automatically energizing the starting motor and ignition system of an automobile at a predetermined time, and maintaining the starting motor circuit potentially energized for a predetermined limited period of time after initial energization of the starting motor and ignition circuits. By the provision of means for limiting the period of potential energization of the starting motor circuit, if the engine is defective and cannot be started by the time-controlled automatic means, the automobile battery is prevented from being exhausted before the engine defect is cured.

As a further feature of my invention means is contemplated whereby the throttle of the engine, normally open preparatory to automatically starting the engine, is automatically closed when the engine is started.

Other objects and advantages of my invention will be apparent from the accompanying drawing and following detailed description.

In the drawings, Fig. 1 is a diagrammatic view of the circuit employed in my invention.

Fig. 2 is a detailed view of the clock-controlled switch and associated mechanisms and circuit.

Fig. 3 is a sectional view taken on line 3—3 of Fig. 2.

Fig. 4 is a detailed sectional view taken on line 4—4 of Fig. 1.

Referring in detail to the drawing, 1 indicates a source of electric current which may comprise the storage battery of the usual automobile. As is conventional, one side of the battery 1 is connected by means of conductor 2 to ground 3. A conductor 4 connects the opposite side of the battery 1 to a plurality of switches which if desired may comprise a single selector switch and may be key operated such as the conventional switches employed in automobiles.

The reference numeral 5 indicates diagrammatically a portion of the dashboard of the automobile. A shaft 6 carrying a knob 7 may be rotatably positioned in the panel 5. On the opposite side of the panel the shaft 6 may carry a soft iron clutch element 8 which is slidably positioned upon shaft 6 and positioned in end to end relationship with respect to a soft iron core 9. The conductor 4 may connect with a conductor 10 through switch 11, the conductor 10 being in turn connected to a solenoid 12 wound around the soft iron core 9, the opposite end of the solenoid being grounded as at 13.

The arrangement is such that when switch 11 is closed the soft iron clutch element 8 is drawn into clutching contact with the core 9 against the compression of spring 8' permitting the core to be rotated by manipulation of the knob 7. When switch 11 is opened the clutch element 8 is retracted from clutching position by spring 8'.

A clock 14 may also be positioned upon the dashboard 5, said clock having a rearwardly extending shaft 15 which carries at its end a spur gear 16. A shaft 17 is rigidly connected to core 9 and carries at its end a spur gear 18 which meshes with the gear 16. It can readily be seen that by rotation of the knob 7 when switch 11 is closed the shaft 15 may be rotated.

Clock 14 may comprise a conventional clock mechanism having an attachment whereby an electric switch is closed at a predetermined time of day. Said clock is also of the type that will maintain the switch in closed position for a predetermined period of time, for instance, for a period of about 30 or 45 seconds. This type of time controlled switch or clock is well known to those skilled in the art and in itself does not comprise my invention.

Referring particularly to Fig. 2 the clock-controlled switch and its associated mechanisms and circuits are shown. Shaft 15, carrying gear 16, comprises a hollow sleeve in which a shaft 15' is rotatably positioned, shaft 15' being the same shaft which carries the hour hand 15''. An arm 16' is rigidly mounted upon sleeve 15, being electrically insulated therefrom by an insulating sleeve 16'', said arm being adapted to rotate with sleeve 15. A switch point 17' is carried at the end of arm 16' for a purpose to be hereinafter more fully described. A spring brush 17'' is mounted upon the interior of the clock casing 14, being insulated therefrom, said brush being connected to conductor 21. The spring brush 17'' slidably bears upon the hub of arm 16' and serves to electrically connect conductor 21 to switch point 17'.

An arm 18', having a switch point 18'' is rigidly mounted upon shaft 15', being electrically insulated from said shaft, the arrangement being such that arm 18' rotates with the rotary movement of the hour hand 15'' of the clock. A spring brush 19' is mounted upon and insulated from the interior of the clock casing and slidably bears upon the hub of the arm 18' making electrical contact therewith, arm 19' being electrically connected to conductor 19''.

The arrangement is such that when gear 16 is rotated by gear 18, that is, by the manipulation of knob 7, arm 16' can be positioned at a predetermined angular relationship with respect to hour hand shaft 15'. Hence, when the hour hand shaft 15' has moved to a coincident position with respect to arm 16', conductors 21 and 19'' are connected together through switch points 17' and 18''.

A time delay relay 20', of conventional construction, is connected between conductors 19'' and 23, the relay 20' being of the type which when manually set in closed position by plunger 20'', will remain in closed position until current has passed therethrough for a predetermined period of time. An adjustable thermal time delay relay well known to those skilled in the art may be employed as the relay 20'. To set the relay 20', an arm 21' carried on the clutch element 8 may function to set plunger 20'' when the clutch element is drawn into clutching relationship with core 9.

The arrangement is such that with switch 11 closed, the solenoid 12 is actuated, causing the engagement of the clutch element 8 with core 9. Arm 21' simultaneously sets plunger 20'' to close the time delay relay 20'. By manipulating knob 7, gear 18 may be rotated thereby rotating gear 16 and, in turn, rotating arm 16' to a desired position, namely, that position which will cause contact points 17' and 18'' to close at a predetermined time, as determined by the normal operation of the clock. Current then passes from conductor 21 to conductor 23. When current passes between these two conductors for a predetermined period of time, as determined by the setting of the time delay relay 20', a period of from about 30 to 45 seconds, the relay 20' opens thereby opening the circuit between conductors 21 and 23. Because of the relatively slow movement of the shaft 15' the period of contact of points 17' and 18'' will always be greater than the set period of the relay 20' and, hence, the opening of the circuit will depend upon the relay rather than the breaking of contact of the points 17' and 18''.

Conductor 4 may be connected to conductor 21 through switch 22, conductor 21 connecting at its opposite end to the clock-controlled switch hereinbefore described, the opposite side of which may be connected to conductor 23. The opposite end of conductor 23 connects with switch 24 which may be interlocked with the transmission of the automobile whereby switch 24 will be maintained open except when the automobile transmission is in "neutral." To close switch 24, the gearshift lever 24' may carry a cam 25' which contacts switch 24 to close the same when the lever 24' is in neutral position.

The opposite side of switch 24 is connected by conductor 25 to a conducting rod 26 which comprises the output shaft of a conventional vacuum bellows 27. The vacuum bellows 27 may be connected by means of a flexible conduit 27', a vacuum booster 28' which, in turn, is connected by pipe 28 to intake manifold 29 of the internal combustion engine.

The conducting rod 26 carries a switch blade 30 which when the automobile engine is inoperative is normally in contact with switch point 31. A conductor 32 connects switch point 31 to a conventional starter solenoid or starter relay 33, the opposite end of the solenoid or relay coil being connected by means of conductor 34 to ground 35.

The starter solenoid or relay 33, when the solenoid circuit is closed, functions to close the relay switch 33'. One side of switch 33' is connected by conductor 34' to the starter motor, shown diagrammatically at 34'' in Fig. 1, the opposite side of the motor being grounded. The opposite side of the switch 33' is connected by means of conductor 35' to conductor 4, as shown best in Fig. 1. Energizing of the starter motor 34'', of course, functions to crank the automobile engine.

A switch point 36 is associated with the switch blade 30 which latter makes contact with the switch point 36 when the internal combustion engine is in operation. Of course, operation of the internal combustion engine establishes vacuum in the intake manifold 29 and the vacuum booster 28' is also operated being mechanically operated from the cam shaft of the engine. The bellows 27 is thereby actuated moving rod 26 and breaking the circuit between switch blade 30 and switch point 31 and making the circuit between blade 30 and switch point 36. Switch point 36 is connected by means of conductor 37 to one side of a conventional thermostatic switch 38. The opposite side of the switch 38 is connected by means of conductor 39 to conductor 21.

The conducting rod 26 is connected by means of conductor 40 to switch 41. Switch 41 and switch 22 are interlocked as indicated by the dotted line at 42 so that the closing or opening of switch 22 results in the closing or opening of switch 41. Conductor 4 from the storage battery 1 connects through switch 43, the opposite side of which is connected to conductor 44. The conductor 44 connects with one side of the conventional circuit breaking mechanism 45 which is adapted to periodically make and break the primary circuit of a conventional ignition coil 46, the secondary coil 47 being connected to the conventional distributor of the automobile (not shown). Lead 48 connects conductor 44 to the opposite side of switch 41.

Conductor 4 from storage battery 1 connects through switch 49 to conductor 50 which in turn connects with conductor 32 leading to the starter solenoid or relay 33.

Rod 26 is rigidly connected to block 51 which is provided with an aperture 52 at its opposite end. Throttle control rod 53, at one end is connected to the conventional accelerator (not shown) whereby said rod is moved axially when the accelerator is manipulated. At the opposite end, rod 53 is rigidly connected to bracket 54 which, adjacent its opposite end is rigidly connected to bellows 27. Rod 53 intermediate its length is slidably positioned in aperture 52 of block 51.

55 indicates the conventional butterfly or throttle valve of a carburetor 56, the butterfly being carried upon rotatable shaft 57. A crank arm 58 (Fig. 4) is carried by shaft 57 and at its end pivotally connects with pin 59 rigidly carried by block 51. A bracket 60 is rigidly mounted upon control rod 53 and at its opposite end functions as an anchor for coil spring 61 which is connected between block 51 and a threaded eye bolt 62. The eye bolt 62 is adjustably secured to bracket 60 by nuts 63 whereby the tension of spring 61 may be adjusted.

In the operation of my invention it may be desired to have the engine of the automobile thoroughly warm at a predetermined time of day. To accomplish this, switch 11 is closed and knob 7 is so manipulated as to set the clock 14 to a predetermined time in advance of the time when the car is to be employed.

After the clock has been properly set switch 11 may be opened and switch 22 closed. It is assumed, of course, that at the time of setting the clock and closing switch 22 the automobile will be parked and consequently the transmission will be in its neutral position. Accordingly, switch 24 will be closed. In addition, switches 43 and 49 will be open.

When the time of day arrives at which the clock 14 is set, the switch carried by the clock will close and the circuit will be completed from the storage battery 1 through switch 22, conductors 21 and 23, switch 24 to conductor 25. The circuit will also be completed through conductor 25, the conducting rod 26, switch blade 30 and switch point 31 to conductor 32. This places the starter solenoid or relay into circuit and the automobile starter commences to crank the engine.

The circuit is also completed through conductor 25 to conductor 40 through switch 41 which has been closed by the closing of switch 22 to the ignition coil 46. Therefore, the engine is supplied with ignition current during the period that the starting motor is cranking the engine.

As the starter motor cranks the engine, it is contemplated that after a cranking period of about 5 seconds a sufficient vacuum will be built up in the bellows 27, due to the intake manifold vacuum and the booster vacuum, to move rod 26. The circuit through switch point 31 will thereby be broken and the circuit through switch point 36 will be completed.

As a result of the cranking the engine will either start or it will not start. If the engine does not start after the initial cranking period the vacuum will slowly be broken in the bellows 27, the vacuum booster functioning as an imperfect check valve for the bellows. As the vacuum gradually becomes broken, rod 26 will slowly move, breaking the circuit between switch blade 30 and switch point 36 and eventually again completing the circuit through switch point 31. The tension of spring 61 may be employed in shortening or lengthening the period of return of the rod 26 by tightening or loosening the tension of said spring. I have found that an inactive period of about 5 to 10 seconds for the return of the rod 26 to complete the blades 30—switch point 31 circuit is satisfactory. Of course, this period of return may be adjusted to suit the starting peculiarities or characteristics of the internal combustion engine.

When the rod 26 has returned to connect blade 30 and point 31, the starter motor is again actuated and the cranking operation is resumed for another period of about 5 seconds, followed by another return period, if the engine does not start. This operation will repeat itself for the duration of the time that the clock switch is closed which has been found to be about 30 to 45 seconds for satisfactory results. Normally, if the engine cannot be started in a period of 30 to 45 seconds by the intermittent cranking operation, hereinbefore described, further cranking will usually result in exhausting the storage battery 1. However, depending upon the starting characteristics of the engine a longer or shorter closed period for the clock switch may be employed.

The spring 61 in addition to controlling the return period of the rod 26, may also control the period of cranking. By tightening the spring, the cranking period may be increased or by loosening it the cranking period may be shortened.

It can readily be seen that, by automatic means the best accepted method of cranking an internal combustion engine is brought about, that is, by having the engine intermittently cranked. Further, useless prolonged cranking of an engine which may be in inoperative condition, resulting merely in exhausting the storage battery, is avoided.

If the engine starts during one of the cranking periods, the completion of the blade 30—switch point 36 circuit will maintain the ignition circuit complete regardless of the opening of the clock switch.

It will be noted that the blade 30—switch point 36 circuit includes the thermostatic switch 38 which may be closed when the engine temperature is below a predetermined "warm" condition, for instance, below about 160° F., the switch opening the circuit when the engine reaches the desired temperature. Therefore, it can be seen that, after being automatically started, as hereinbefore described, the thermostatic switch 38 will function to automatically stop the engine by breaking the ignition circuit, when the engine temperature reaches a predetermined degree.

It will be noted that the assembly comprising bellows 27 and bracket 60 are rigidly carried by the throttle control rod 53. Hence, during normal operation of the automobile movement of the throttle control rod results in movement of the bellows 27 and bracket 60. This movement is permitted by the flexible tubing 27' which connects to vacuum booster 28' to bellows 27. Rod 26 and block 51 will move with control rod 53 since movement of the throttle shaft 57 offers less friction or resistance than movement of rod 26 with respect to bellows 27. Spring 61, also augments this latter resistance.

However, during the automatic operation, the bellows rod 26 may operate independently of the control rod 53 to operate the throttle shaft 57 by virtue of the slidable relationship of block 51 and rod 53. Hence, the parts are so positioned relative to each other, when the engine is not in operation that throttle 55 will be partially open. However, when rod 26 is moved by bellows 27 the throttle 55 will be returned to normal idling position. This, of course, is the normal driving position of the throttle and, thereafter, manipulation of the accelerator will not change the relative positions of the assembly carried by rod 53 or any of the parts carried by the assembly. In holding the throttle 55 partially open during the cranking period, starting of the engine is facilitated.

During the normal driving of the automobile both switches 11 and 22 are open. As has been hereinbefore described switch 24 is only closed when the automobile is in neutral and switch 41 is only closed when switch 22 is closed. By the provision of switch 41 and the opening thereof with switch 22 a reverse feed of current is prevented when switch 43, the normal ignition switch of the automobile, is closed. Switch 49 indicates the normal manually operated starter switch for the automobile. As has been hereinbefore described switches 11, 22, 43 and 49 may all be key-operated and may be positioned on the dashboard of the automobile.

I claim as my invention:

1. A device for automatically cranking an internal combustion engine having an electric starting motor for cranking the engine, an ignition circuit and a source of electric current which comprises, a starting motor controlling circuit and an auxiliary circuit connected to said ignition circuit both of which have a common branch when said engine is inoperative, master switch means for connecting said common branch to said source of current, normally open switch means interposed in said common branch, clock means for closing said switch means for a predetermined period of time in response to a predetermined time indication by said clock means to energize said starting motor and connect said ignition circuit to said source of current, and separate circuit means for connecting said ignition circuit to the source of current when said clock operated switch is opened.

2. A device for automatically cranking an internal combustion engine having an electric starting motor for cranking the engine, an ignition circuit and a source of electric current which comprises, a starting motor controlling circuit and an auxiliary circuit connected to said ignition circuit both of which have a common branch when said engine is inoperative, master switch means for connecting said common branch to said source of current, normally open switch means interposed in said common branch, clock means for closing said switch means for a predetermined period of time in response to a predetermined time indication by said clock means to energize said starting motor and connect said ignition circuit to said source of current, a running circuit connected at one end through said master switch means to said source of current, a two-way switch the common pole of which is connected to said common branch, one alternate pole of which connects to said running circuit and the other alternate pole connects to the starting motor controlling circuit, and means for actuating said two-way switch to disconnect the starter circuit from the common branch pole and connect the common branch to said running circuit when said engine has been cranked for a predetermined period of time.

3. A device for automatically cranking an internal combustion engine having an electric starting motor for cranking the engine, an ignition circuit and a source of electric current which comprises, a starting motor controlling circuit and an auxiliary circuit connected to said ignition circuit both of which have a common branch when said engine is inoperative, master switch means for connecting said common branch to said source of current, normally open switch means interposed in said common branch, clock means for closing said switch means for a predetermined period of time in response to a predetermined time indication by said clock means to energize said starting motor and connect said ignition circuit to said source of current, a running circuit connected at one end through said master switch means to said source of current, a two-way switch the common pole of which is connected to said common branch, one alternate pole of which connects to said running circuit and the other alternate pole connects to the starting motor controlling circuit, and means for actuating said two-way switch to disconnect the starter circuit from the common branch pole and connect the common branch to said running circuit when said engine has been cranked into operation, said two-way switch actuating means comprising vacuum operated means connected to the intake manifold of the engine.

4. A device for automatically cranking an internal combustion engine having an electric starting motor for cranking the engine, an ignition circuit and a source of electric current which comprises, a starting motor controlling circuit and an auxiliary circuit connected to said ignition circuit both of which have a common branch when said engine is inoperative, master switch means for connecting said common branch to said source of current, normally open switch means interposed in said common branch, clock means for closing said switch means for a predetermined period of time in response to a predetermined time indication by said clock means to energize said starting motor and connect said ignition circuit to said source of current, a running circuit connected at one end through said master switch means to said source of current, a two-way switch the common pole of which is connected to said common branch, one alternate pole of which connects to said running circuit and the other alternate pole connects to the starting motor controlling circuit, and means for actuating said two-way switch to disconnect the starter circuit from the common branch pole and connect the common branch to said running circuit when said engine has been cranked into operation, said two-way switch actuating means comprising vacuum operated means connected to the intake manifold of the engine, and thermostatic switch means responsive to the temperature of said engine interposed in said running circuit to break said circuit when the engine becomes heated to a predetermined degree.

5. A device for automatically energizing the starter motor of an internal combustion engine which comprises a starter motor controlling circuit and an ignition circuit both having a common branch, a clock-controlled switch connected in said common branch to energize said circuits for a predetermined period of time to crank said engine, an auxiliary ignition circuit, make and break means for breaking said starter motor controlling circuit and making said auxiliary ignition circuit when said engine starts to maintain said engine in operation after said clock-controlled predetermined period of time.

6. A device for automatically energizing the starter motor of an internal combustion engine which comprises a starter motor controlling circuit and an ignition circuit both having a common branch, a clock-controlled switch connected in said common branch to energize said circuits for a predetermined period of time to crank said engine, an auxiliary ignition circuit, make and break means for breaking said starter motor controlling circuit and making said auxiliary ignition circuit when said engine starts to maintain said engine in operation after said clock-controlled predetermined period of time and thermostatically operated switch means responsive to the temperature of said engine to open said auxiliary ignition circuit when said engine temperature reaches a predetermined degree.

7. A device for automatically energizing the starter motor of an internal combustion engine which comprises a starter motor controlling circuit and an ignition circuit both having a common branch, a clock-controlled switch connected in said common branch to energize said circuits for a predetermined period of time to crank said engine, an auxiliary ignition circuit, make and break means for breaking said starter motor controlling circuit and making said auxiliary ignition circuit when said engine starts to maintain said engine in operation after said clock-controlled predetermined period of time, said make and break means including a make and break switch, and vacuum operated means connected to the intake manifold of said engine.

8. A device for automatically energizing the starter motor of an internal combustion engine which comprises a starter motor controlling circuit and an ignition circuit both having a common branch, a clock-controlled switch connected in said common branch to energize said circuits for a predetermined period of time to crank said engine, an auxiliary ignition circuit, make and break means for breaking said starter motor controlling circuit and making said auxiliary ignition circuit when said engine starts to maintain said engine in operation after said clock controlled predetermined period of time, said make and break means including a make and break switch, and vacuum operated means connected to the intake manifold of said engine, a spring pressed member for normally holding the engine throttle open when the engine is inoperative, and means connecting said member to said vacuum operated means to close said throttle when said engine is cranked into operation.

9. A device for automatically energizing the starter motor of an internal combustion engine which comprises a starter motor controlling circuit and an ignition circuit both having a common branch, a clock-controlled switch connected in said common branch to energize said circuits for a predetermined period of time to crank said engine, an auxiliary ignition circuit, make and break means for breaking said starter motor controlling circuit and making said auxiliary ignition circuit when said engine starts to maintain said engine in operation after said clock-controlled predetermined period of time, a thermostatically operated switch means responsive to the heat generated by the engine to open said auxiliary ignition circuit when the temperature of said engine generated heat reaches a predetermined degree.

FRANCIS J. PERHATS.

REFERENCES CITED

The following references are of record in the file of this patent:

UNITED STATES PATENTS

| Number | Name | Date |
| --- | --- | --- |
| 1,269,637 | Olmsted | June 18, 1918 |
| 1,287,266 | Eberly | Dec. 10, 1918 |
| 1,293,569 | Stein | Feb. 4, 1919 |
| 1,344,464 | Varley | June 22, 1920 |
| 1,659,220 | Johnstone et al. | Dec. 27, 1927 |
| 1,919,817 | Wilcox | July 25, 1933 |
| 1,932,064 | Conant et al. | Oct. 24, 1933 |
| 2,007,058 | Maurer | July 2, 1935 |
| 2,197,726 | Johnson | Apr. 16, 1940 |
| 2,497,948 | Lincoln | Feb. 21, 1950 |